(12) United States Patent
Whipple

(10) Patent No.: US 11,787,246 B2
(45) Date of Patent: Oct. 17, 2023

(54) STABILIZER SYSTEM FOR AN OFF-ROAD TRAILER

(71) Applicant: Jon L. Whipple, Reno, NV (US)

(72) Inventor: Jon L. Whipple, Reno, NV (US)

(*) Notice: Subject to any disclaimer, the term of this patent is extended or adjusted under 35 U.S.C. 154(b) by 246 days.

(21) Appl. No.: 17/393,777

(22) Filed: Aug. 4, 2021

(65) Prior Publication Data

US 2022/0041024 A1 Feb. 10, 2022

Related U.S. Application Data

(60) Provisional application No. 63/062,604, filed on Aug. 7, 2020.

(51) Int. Cl.
| | | |
|---|---|---|
| *B60D 1/32* | (2006.01) | |
| *B60D 1/46* | (2006.01) | |
| *B60D 1/167* | (2006.01) | |
| *B60D 1/06* | (2006.01) | |

(52) U.S. Cl.
CPC .............. *B60D 1/32* (2013.01); *B60D 1/065* (2013.01); *B60D 1/1675* (2013.01); *B60D 1/46* (2013.01)

(58) Field of Classification Search
CPC ........ B60D 1/32; B60D 1/065; B60D 1/1675; B60D 1/46; B60D 1/322; B60D 1/167
See application file for complete search history.

(56) References Cited

U.S. PATENT DOCUMENTS

| | | | | |
|---|---|---|---|---|
| 2,699,956 A | * | 1/1955 | Mattson | B60D 1/32 |
| | | | | 280/455.1 |
| 2,709,604 A | | 5/1955 | Hartman | |
| 3,284,098 A | * | 11/1966 | Worley | B60D 1/322 |
| | | | | 280/489 |
| 3,697,099 A | * | 10/1972 | Potts | B60D 1/322 |
| | | | | 280/455.1 |
| 3,722,920 A | * | 3/1973 | Reese | B60D 1/322 |
| | | | | 188/269 |
| 4,195,861 A | | 4/1980 | Philipponi | |
| 4,262,922 A | * | 4/1981 | Nelson | B62D 53/0871 |
| | | | | 280/414.1 |
| 4,295,659 A | * | 10/1981 | Mergen | B62D 13/00 |
| | | | | 280/455.1 |

(Continued)

FOREIGN PATENT DOCUMENTS

| | | | | |
|---|---|---|---|---|
| EP | | 0747244 | 12/1996 | |
| WO | WO-2007016745 A1 | * | 2/2007 | .............. B60D 1/30 |

*Primary Examiner* — Jacob D Knutson
*Assistant Examiner* — Ryan Edward Hardy
(74) *Attorney, Agent, or Firm* — Brownstein Hyatt Farber Schreck, LLP

(57) ABSTRACT

A stabilization system for an off-road trailer may include a hitch ball assembly, a tower assembly, and a stabilizer arm assembly. The tower assembly may include a pivot mechanism that allows the stabilizer arm assembly to pivot about a pivot axis relative to the hitch ball assembly. The stabilizer arm assembly may include one or more arms extending between the pivot axis and the off-road trailer and one or more piston damping assemblies extending between the arms and the off-road trailer. The piston damping assemblies may be configured to exert forces on the off-road trailer in response to the off-road trailer moving with respect to a towing vehicle to reduce further motion of the off-road trailer with respect to the towing vehicle.

20 Claims, 7 Drawing Sheets

(56) References Cited

U.S. PATENT DOCUMENTS

| | | | | |
|---|---|---|---|---|
| 4,313,616 A | * | 2/1982 | Howard | B60T 13/74 |
| | | | | 188/112 A |
| 4,536,001 A | | 8/1985 | Wagner | |
| 4,610,325 A | * | 9/1986 | Anderson | B62D 59/04 |
| | | | | 280/476.1 |
| 5,161,815 A | * | 11/1992 | Penor, Jr. | B60D 1/363 |
| | | | | 280/405.1 |
| 5,348,331 A | * | 9/1994 | Hawkins | B60D 1/322 |
| | | | | 280/455.1 |
| 6,283,489 B1 | | 9/2001 | Hoog | |
| 6,361,062 B1 | * | 3/2002 | Edin | B60D 1/07 |
| | | | | 280/416.2 |
| 6,419,257 B1 | | 7/2002 | McCoy et al. | |
| 7,093,845 B1 | | 8/2006 | Fast | |
| 7,261,312 B1 | | 8/2007 | Joplin | |
| 8,033,561 B2 | | 10/2011 | McCune | |
| 8,246,067 B1 | | 8/2012 | Flathers | |
| 10,377,587 B2 | | 8/2019 | Kimener | |
| 2005/0057019 A1 | * | 3/2005 | Colibert | B60D 1/345 |
| | | | | 280/405.1 |
| 2009/0211207 A1 | | 8/2009 | Kelly | |
| 2011/0181021 A1 | | 7/2011 | Frocklage | |
| 2022/0250423 A1 | * | 8/2022 | McDonald | B60D 1/62 |

* cited by examiner

STABILIZER SYSTEM FOR AN OFF-ROAD TRAILER

CROSS-REFERENCE TO RELATED APPLICATION

This application is a nonprovisional of, and claims the benefit under 35 U.S.C. § 119(e) of, U.S. Provisional Patent Application No. 63/062,604, filed Aug. 7, 2020, the contents of which are incorporated herein by reference as if fully disclosed herein.

FIELD

The described embodiments relate generally to trailers and trailer accessories. More particularly, the present embodiments relate to a stabilizer system for an off-road trailer.

BACKGROUND

Off-road vehicles have become more commonplace with the availability of more compact and powerful engine designs and more sophisticated suspension capabilities. Users of off-road vehicles are beginning to take longer trips off-road and may require additional storage and/or sleeping facilities that may normally be provided by a trailer or other towed vehicle. However, due to the extreme driving conditions encountered while driving an off-road vehicle, traditional trailers and trailer towing systems are inadequate as they may not properly stabilize and support the trailer over large bumps or uneven surfaces. The systems and techniques described herein may be used to improve the stability and performance of a trailer or other towed vehicle in off-road or other challenging driving conditions.

SUMMARY

The embodiments described herein are generally directed to stabilization systems for use with towing trailers.

One embodiment may take the form of a stabilization system for use with an off-road trailer. The stabilization system may include a hitch ball assembly, a tower assembly, and a stabilizer arm assembly. The hitch ball assembly may include a tow beam having a first end configured to attach to a trailer hitch receiver of a towing vehicle and a second end opposite the first end. The tow beam may define a central axis. The hitch ball assembly may further include a hitch ball coupled to the second end of the tow beam. The tower assembly may be coupled to the hitch ball assembly and may include a riser beam extending upward from the tow beam and a pivot mechanism configured to rotate about a pivot axis that is transverse to the central axis of the tow beam. The stabilizer arm assembly may be coupled to the pivot mechanism and may be configured to rotate about the pivot axis. The stabilizer arm assembly may include a first arm extending toward a trailer at a first angle with respect to the central axis of the tow beam and a second arm extending toward the trailer at a second angle with respect to the central axis of the tow beam. The stabilizer arm assembly may further include a first piston damping assembly extending from the first arm to the trailer and a second piston damping assembly extending from the second arm to the trailer.

Another embodiment may take the form of a trailer system for towing behind an off-road vehicle. The trailer system may include a trailer and a stabilizer system coupled to the trailer. The trailer may include a trailer frame having first and second frame rails and a trailer body positioned over the first and second frame rails. The trailer may further include a tongue that includes a first tongue section extending from the trailer frame, a second tongue section extending from the trailer frame, and a trailer coupler assembly attached to the first and second tongue sections. The stabilizer system may include a hitch ball assembly, a tower assembly, and a stabilizer arm assembly. The hitch ball assembly may include a tow structure configured to attach to a trailer hitch receiver of a towing vehicle and a towing hitch coupler assembly coupled to the trailer coupler assembly of the trailer. The tower assembly may be coupled to the hitch ball assembly and may include a riser structure extending upward from the tow structure and a pivot mechanism configured to rotate about a pivot axis. The stabilizer arm assembly may be coupled to the pivot mechanism and configured to rotate about the pivot axis. The stabilizer arm assembly may include first and second arms extending toward the trailer. The stabilizer arm assembly may further include a first piston damping assembly extending from the first arm to the first tongue section of the trailer and a second piston damping assembly extending from the second arm to the second tongue section of the trailer.

Still another embodiment may take the form of a stabilization system for use with an off-road trailer. The stabilization system may include a tow beam configured to attach to a trailer hitch receiver of a towing vehicle. The tow beam may define a central axis. The stabilization system may further include a hitch ball coupled to the tow beam and configured to couple to a trailer coupler assembly of a trailer and a riser beam extending from the tow beam. The stabilization system may further include an arm structure pivotally coupled to the riser beam and configured to rotate about a pivot axis that is perpendicular to the central axis of the tow beam. The arm structure may define a first arm extending toward the trailer at a first angle with respect to the central axis of the tow beam and a second arm extending toward the trailer at a second angle with respect to the central axis of the tow beam. The stabilization system may further include a first piston damping assembly extending from the first arm to the trailer and a second piston damping assembly extending from the second arm to the trailer.

BRIEF DESCRIPTION OF THE DRAWINGS

The disclosure includes the following detailed description and corresponding drawings.

DETAILED DESCRIPTION

Figure 1:
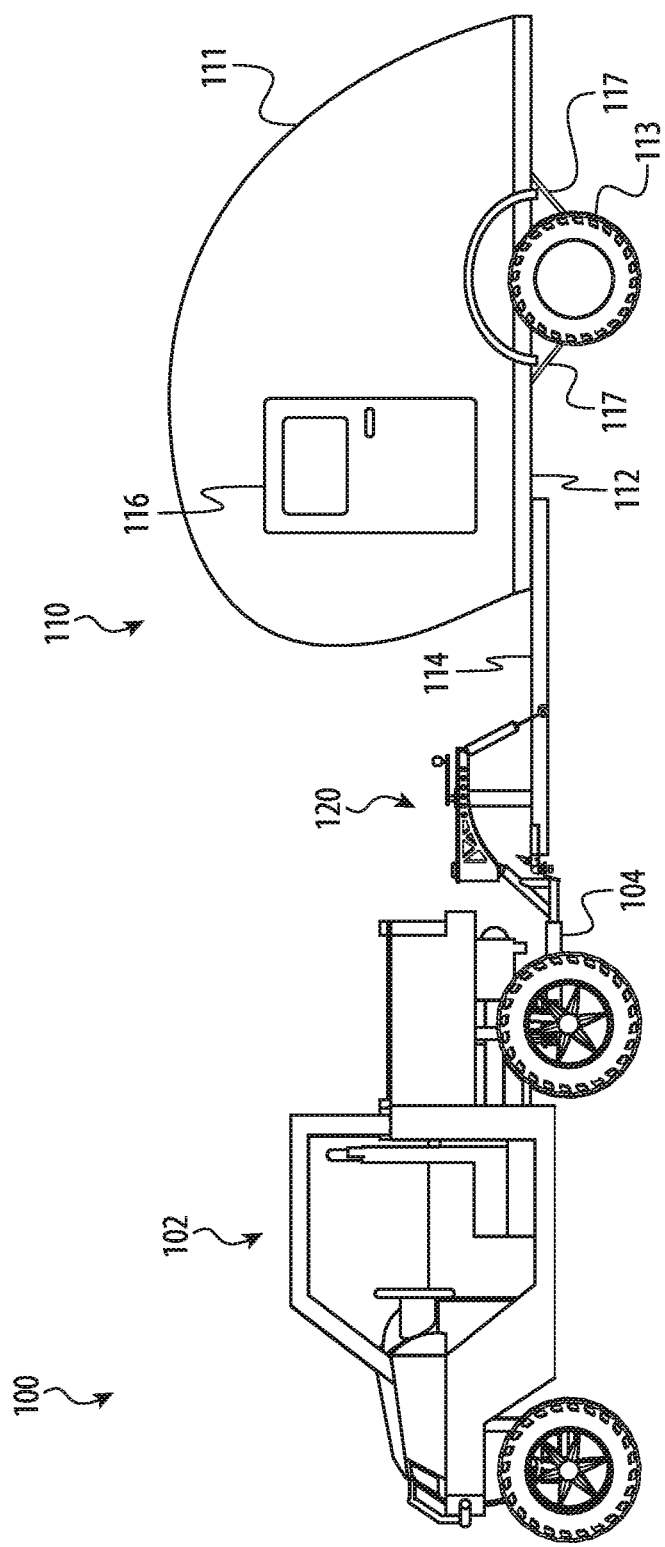
FIG. 1 illustrates an example vehicle combination that includes a stabilization system.

The embodiments described herein relate to a stabilization system for towing a trailer behind a towing vehicle. The towing vehicle and/or the trailer may be suitable for on-road and/or off-road travel. In both on- and off-road contexts, the path upon which the vehicle combination is traveling (e.g., a road or other surface) may include obstacles (e.g., rocks, bumps, dips, and other objects and features) that make the path rough. The wheels and tires of the towing vehicle and the trailer may move in directions other than the path of travel of the vehicle combination in response to encountering these obstacles. It is often desirable to minimize the amount of this motion that is transferred to the other portions of the vehicle and the trailer (e.g., body sections where passengers or cargo are located). The towing vehicle and/or the trailer may include suspension systems that reduce the amount of this motion that is transferred to the rest of the vehicle and the trailer. This may allow the vehicle combination to pass over obstacles (e.g., rocks and other features) at relatively high speeds while maintaining an acceptably smooth ride quality.

It is also desirable to reduce the amount of motion of the trailer relative to the towing vehicle. The trailer may move relative to the towing vehicle, for example in response to the trailer and the towing vehicle hitting different obstacles, hitting obstacles at different times, and/or reacting differently to hitting obstacles. Additionally, the trailer may be lightweight so that it may be more easily and more efficiently towed by the towing vehicle. As a result, even with the suspension systems of the vehicle and the trailer, the trailer could be subject to undesired motion with respect to the towing vehicle when the trailer and/or the towing vehicle encounter certain obstacles. This undesired motion may include the trailer lifting with respect to the towing vehicle. Lifting of the trailer may include the rear end of the trailer pitching upward with respect to the towing vehicle due to uneven terrain or other obstacles. Lifting of the trailer may additionally or alternatively include the trailer being subjected to an impact or force that causes a rotation of the trailer about the axle of the trailer. The undesired motion may additionally or alternatively include the trailer rolling with respect to the towing vehicle. Rolling of the trailer may include the trailer pitching left or right (e.g., rotating about an axis that is perpendicular to the axle of the trailer, such as a central axis of a tow beam).

Left unaddressed, the undesired motion discussed above may adversely affect the performance of the vehicle combination. For example, excessive, undamped trailer motion may reduce ride quality of the vehicle, cause the vehicle to travel slower over rough terrain, or, in some cases, avoid rough terrain altogether. The stabilization systems described herein may stabilize the trailer as it passes over large obstacles or rough terrain by, for example, exerting stabilizing forces on the trailer in response to the trailer moving with respect to the towing vehicle to reduce the amount by which the trailer moves with respect to the towing vehicle. This may reduce the chances of damage to the trailer and the towing vehicle and improve ride quality, potentially allowing the vehicle combination to pass over large obstacles at higher speeds.

The stabilization systems described herein may include a hitch ball assembly, a tower assembly, and a stabilizer arm assembly. The hitch ball assembly may include a tow beam that is configured to be coupled to a trailer hitch receiver of the towing vehicle. The hitch ball assembly may additionally include a hitch ball configured to be coupled to a trailer coupler assembly of the trailer. The tower assembly may include a riser structure extending upward from the tow beam and a pivot mechanism that allows the stabilizer arm assembly to pivot relative to the hitch ball assembly.

The stabilizer arm assembly may include the arms and piston damping assemblies extending from the arms to the trailer. The piston damping assemblies may exert forces on the trailer to reduce the amount that the trailer moves with respect to the towing vehicle. For example, in response to the trailer lifting with respect to the towing vehicle, the piston damping assemblies may exert a downward (pushing) force on a tongue of the trailer to keep the trailer from lifting further. As another example, in response to the trailer rolling with respect to the towing vehicle, one piston damping assembly may exert a downward (pushing) force on a tongue of the trailer and one piston damping assembly may exert an upward (pulling) force on the tongue of the trailer to keep the trailer from rolling further.

These and other embodiments are discussed below with reference to FIGS. 1-6. However, those skilled in the art will readily appreciate that the detailed description given herein with respect to these Figures is for explanatory purposes only and should not be construed as limiting.

FIG. 1 illustrates an example vehicle combination 100 that includes a stabilization system. The vehicle combination 100 includes a towing vehicle 102, a trailer 110, and a stabilization system 120 to improve the stability and performance of the off-road vehicle combination.

The stabilization system 120 may stabilize the trailer 110 as it passes over such obstacles, for example by exerting stabilizing forces on the trailer in response to the trailer moving with respect to the towing vehicle 102 to reduce the amount by which the trailer moves with respect to the towing vehicle. This may reduce the chances of damage to the trailer 110 and the towing vehicle 102 and improve ride quality, potentially allowing the vehicle combination 100 to pass over obstacles or uneven surfaces at higher speeds.

The stabilization system 120 may be used to couple the trailer 110 to the towing vehicle 102 to facilitate towing of the trailer. The stabilization system 120 may be coupled to a hitch receiver 104 of the towing vehicle 102 and a trailer tongue 114 or tow beam of the trailer 110 to couple the trailer to the towing vehicle.

The towing vehicle 102 may be any suitable vehicle (e.g., a motor vehicle) for towing a trailer. In some cases, the towing vehicle 102 is an off-road vehicle, such as a side-by-side or utility terrain vehicle (UTV) capable of carrying 2-6 passengers plus cargo. In some cases, the towing vehicle 102 has a gross vehicle weight rating (GVWR) of less than 4000 pounds. In some cases, the towing vehicle 102 has a gross vehicle weight rating (GVWR) of less than 2000 pounds. The towing vehicle 102 may have enhanced suspension capabilities as discussed above. In some cases, the towing vehicle may have a suspension system that provides between 10 and 20 inches of wheel travel.

The trailer 110 may include a trailer frame 112 and a trailer body 111 positioned on the trailer frame. The trailer frame 112 may include two or more frame rails that extend between a front of the trailer and a rear of the trailer (e.g., from left to right with respect to FIG. 1). The trailer body 111 may be positioned over at least a portion of the trailer frame (e.g., over the frame rails). The trailer 110 may include a tongue 114 that is attached to or integrated with the trailer frame 112. The tongue 114 may extend from a front of the trailer body 111, and may include a trailer coupler assembly for coupling the trailer to a towing hitch coupler, as discussed in more detail with respect to FIG. 2.

The trailer 110 may include a wheel assembly 113 including a set of wheels, which is coupled to the trailer frame 112 by a suspension system 117. The wheel assembly 113, in this example, includes a pair of wheels (having off-road tires)

that are coupled to the trailer frame 112 by a suspension system 117. The suspension system may include a set of leaf springs or similar suspension elements that are coupled to an axle assembly of the wheel assembly 113. Alternatively, the suspension system 117 may provide independent suspension to each wheel of the wheel assembly 113 using various armatures or linkages.

As noted above, the suspension system 117 of the trailer 110 may dampen motion caused by rough terrain and/or reduce the amount of motion that is transferred from the wheel assembly 113 to the trailer frame 112. The trailer body 111 may have an interior volume for carrying cargo and/or people. The trailer body 111 may include an access door 116 for accessing the interior volume. In some cases, the trailer 110 may include a frame without a trailer body, or a frame with other components. The trailer 110 may have a GVWR of less than 1500 pounds, less than 1000 pounds, less than 800 pounds, or the like.

Figure 2:
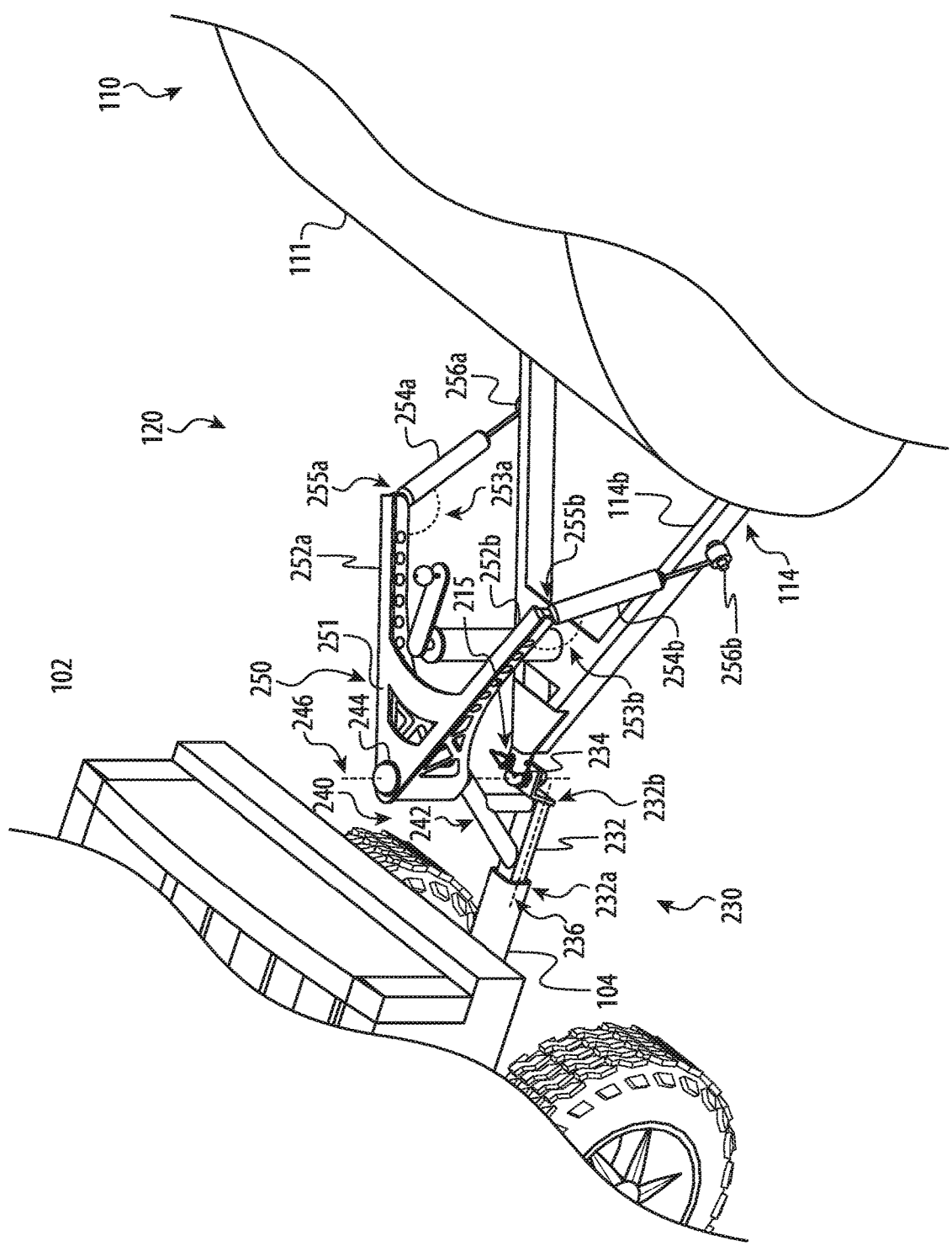
FIG. 2 illustrates an enlarged view of the stabilization system of FIG. 1.

As noted above, the stabilization system 120 may couple the trailer 110 to the towing vehicle 102. FIG. 2 illustrates an enlarged view of the stabilization system 120 of FIG. 1. The stabilization system 120 may include a hitch ball assembly 230 that includes a tow structure (e.g., a tow beam 232) and trailer coupler assembly (e.g., a hitch ball 234). The tow beam 232 may be configured to be attached to the towing vehicle 102. For example, a first end 232a of the tow beam 232 may be attached to (e.g., inserted into) the hitch receiver 104 of the towing vehicle 102. The tow beam 232 may define a central axis 236 extending between the first end 232a and the second end 232b. The hitch ball 234 may be coupled to a second end 232b of the tow beam 232 that is opposite the first end 232a. The hitch ball 234 may be configured to be coupled to a trailer coupler assembly 215 of the trailer 110.

The trailer coupler assembly 215 may be attached to or integrated with the tongue 114 of the trailer 110. The tongue 114 may include a first section 114a and a second section 114b that meet at the trailer coupler assembly 215. In other embodiments, the tongue 114 may be a single member extending between the trailer frame 112 and the trailer coupler assembly 215. The trailer coupler assembly 215 may be configured to at least partially surround and engage the hitch ball 234 and pivot relative to the hitch ball to pivotally couple the trailer 110 to the stabilization system 120, and therefore to the towing vehicle 102.

The tow beam 232 is just one example of a tow structure. In various embodiments, the tow structure of the hitch ball assembly 230 may be any suitable structure, including one or more beams or other members. The hitch ball 234 is just one example of a towing hitch coupler assembly that may couple to the trailer coupler assembly 215. In various embodiments, the hitch ball assembly of the stabilization system 120 and/or the trailer coupler assembly 215 may include any suitable type of towing assembly, including various combinations of drawbars, tow pins, pintles and gudgeons, three-point hitches, fifth wheel couplings, and the like.

The stabilization system 120 may include a tower assembly 240 coupled to the hitch ball assembly 230. The tower assembly 240 may include a riser structure 242 extending upward from the tow beam 232 and a pivot mechanism 244 coupled to the riser structure 242. The riser structure 242 may include one or more riser beams or other members that extend from the tow beam 232.

The stabilization system 120 may further include a stabilizer arm assembly 250 that is configured to rotate with respect to the riser structure 242 and the hitch ball assembly 230. The pivot mechanism 244 may facilitate rotation of the stabilizer arm assembly 250. The stabilizer arm assembly 250 may be configured to rotate about a pivot axis 246 defined by the pivot mechanism 244. The pivot axis 246 may be transverse or perpendicular to a central axis 236 of the tow beam 232. In some cases, the pivot axis 246 intersects a center of the hitch ball 234 such that a pivot axis about which the trailer coupler assembly 215 rotates is the same as (or substantially aligned with) the pivot axis 246. Whereas the hitch ball 234 may allow the trailer 110 to pitch and roll, the pivot mechanism 244 may be constrained such that it allows rotation only around the pivot axis 246 (e.g., yaw) and does not allow substantial movement in other directions (e.g., pitch and roll). This may contribute to the ability of the stabilization system 120 to stabilize the trailer.

The stabilizer arm assembly 250 may include one or more arms (e.g., a first arm 252a and a second arm 252b) that extend toward the trailer 110. The arms 252a, 252b may extend from the pivot mechanism 244 or another component coupled to the pivot mechanism 244. In some cases, the arms 252a, 252b are defined by an arm structure 251. In other cases, the arms 252a, 252b may be separate components. The arms 252a, 252b may be rigid such that they maintain their shape under applied force and do not substantially flex or bend.

The stabilizer arm assembly 250 may further include one or more piston damping assemblies (e.g., a first piston damping assembly 254a extending from the first arm 252a to the trailer 110 and a second piston damping assembly 254b extending from the second arm 252b to the trailer 110). The piston damping assemblies 254a, 254b may be configured to exert one or more forces on the trailer 110 to prevent or reduce movement of the trailer relative to the towing vehicle 102. In some cases, the piston damping assemblies 254a, 254b may be configured to exert a downward force on the trailer 110 in response to the trailer 110 lifting with respect to the towing vehicle 102.

The piston damping assemblies 254a, 254b may exert different forces on the trailer 110 in various embodiments. In response to the trailer 110 rolling with respect to the towing vehicle 102 (e.g., rolling about the central axis 236 of the tow beam 232), the piston damping assemblies 254a, 254b may exert forces in opposing directions to prevent or reduce the rolling of the trailer 110. For example, in response to the trailer rolling clockwise about the central axis 236, the piston damping assembly 254a may exert an upward (e.g., pulling) force on the trailer 110, and the piston damping assembly 254b may exert a downward (e.g., pushing) force on the trailer 110 to counteract the rolling motion.

The piston damping assemblies 254a, 254b may be attached to the arms 252a, 252b using fastening mechanisms 255a, 255b, respectively. The fastening mechanisms 255a, 255b may be or include bolts, pins, or other fasteners that extend through holes in the arm structure 251. In some cases, the fastening mechanisms 255a, 255b include one or more hinges or pivot mechanisms (e.g., pin hinges, ball-and-socket joints, and the like) so that the piston damping assemblies 254a, 254b may be attached to different trailers having different structures or attachment positions.

The piston damping assemblies 254a, 254b may be removably attached to the trailer 110 using fastening mechanisms 256a, 256b, respectively. The fastening mechanisms 256a, 256b may be or include bolts, pins, or other fasteners that extend through holes in the trailer tongue sections 114a, 114b. In some cases, the fastening mechanisms 256a, 256b include one or more hinges or pivot mechanisms (e.g., pin hinges, ball-and-socket joints, and the like) so that the piston damping assemblies 254a, 254b may be attached to different trailers having different structures or attachment positions. In some cases, the fastening mechanisms 256a, 256b may include brackets or other elements that at least partially surround the trailer tongue sections 114a, 114b to couple the piston damping assemblies 254a, 254b to the trailer 110. In some cases, the piston damping assemblies 254a, 254b may be permanently attached to the trailer 110 (e.g., by welding).

As shown in FIG. 2, the arms 252a, 252b may extend along a plane that is parallel to the central axis 236 of the tow beam 232 and/or perpendicular to the pivot axis 246. Each of the piston damping assemblies 254a, 254b may extend from the respective arm 252a, 252b to the trailer 110 at a respective angle 253a, 253b relative to the arms 252a, 252b and/or the central axis 236 of the tow beam 232. In some cases, the angles 253a, 253b may be 90 degrees (e.g., the piston damping assemblies extend parallel to the pivot axis 246). In some cases, the angles 253a, 253b may be greater than 90 degrees such that the piston damping assemblies 254a, 254b extend away from the pivot axis 246 and toward the trailer 110, as shown in FIG. 2. In some cases, the angles 253a, 253b are between 120 and 150 degrees or between 130 and 140 degrees. Said another way, each piston damping assembly 254a, 254b may extend at a respective angle 253a, 253b that is between 30 and 60 degrees, between 35 and 55 degrees, or between 40 and 50 degrees relative to the pivot axis 246.

The stabilizer arm assembly 250 may be configured to pivot about the pivot axis 246. In some cases, the pivot mechanism 244 includes a vertical member (e.g., a pivot axle) that extends at least partially through an opening in the arm structure 251 and allows the arm structure 251 to pivot about the pivot axis 246. As noted above, the pivot axis 246 may pass through a center the hitch ball 234 such that the stabilizer arm assembly 250 pivots in conjunction with the trailer 110 pivoting about the hitch ball 234. Said another way, as the trailer pivots about the hitch ball 234 (and therefore about the pivot axis 246), the stabilizer arm assembly 250 maintains alignment with (e.g., does not pivot about the pivot axis 246 relative to) the trailer tongue 114.

In the embodiment shown in FIG. 2, the pivot mechanism 244 may be a spindle hinge in which at least a portion of the pivot mechanism extends through an opening in the arm structure 251 such that the arm structure 251 pivots around the portion of the pivot mechanism. In various embodiments, the pivot mechanism 244 may be any suitable mechanism. In some cases, for example, a portion of the arm structure 251 may protrude into an opening defined by the riser structure 242 to facilitate rotation of the arm structure 251 about the pivot axis 246. In some cases, the pivot mechanism 244 may be defined by plates that swivel with respect to one another to allow the stabilizer arm assembly 250 to pivot relative to the tower assembly 240. One plate may be attached to the riser structure 242 and one plate may be attached to the arm structure 251 such that the arm structure can swivel with respect to the riser structure.

In various embodiments, the piston damping assemblies 254a, 254b may be or include any suitable components for absorbing, damping, and/or dissipating energy when displaced, deformed, stretched or the like. Each piston damping assembly 254a, 254b may be a gas-charged strut having an internal piston that resists compression and/or expansion of the assembly. The piston damping assemblies 254a, 254b may be or include pneumatic and hydraulic shock absorbers or dampers, cushions, elastomers or other compliant materials, springs (e.g., coil springs or leaf springs), electromagnets, and the like. The piston damping assemblies 254a, 254b may be or include twin-tube shock absorbers, coil-over shock absorbers, monotube shock absorbers, spool valve shock absorbers, and the like. In various embodiments, the piston damping assemblies may be adjustable or tunable.

The arm structure 251, the tow beam 232, and the riser structure 242 may be formed of any suitable material or combination of materials, including steel, other metals, composite materials, polymers, and the like. In some cases, the arm structure 251, the tow beam 232, and the riser structure 242 may be formed from steel tube sections, bars, or the like that are welded and/or bolted together.

In some cases, a height of the pivot mechanism 244 relative to the tow beam 232 is adjustable, as discussed in more detail below with respect to FIG. 4. In some cases, the tower assembly 240 and/or the stabilizer arm assembly 250 may include a swivel prohibitor to prevent the stabilizer arm assembly 250 from pivoting about the pivot axis 246. The swivel prohibitor may be removable or otherwise controllable such that the ability for the stabilizer arm assembly 250 to pivot is controllable. An example swivel prohibitor is discussed is more detail below with respect to FIG. 5.

Figure 3A:
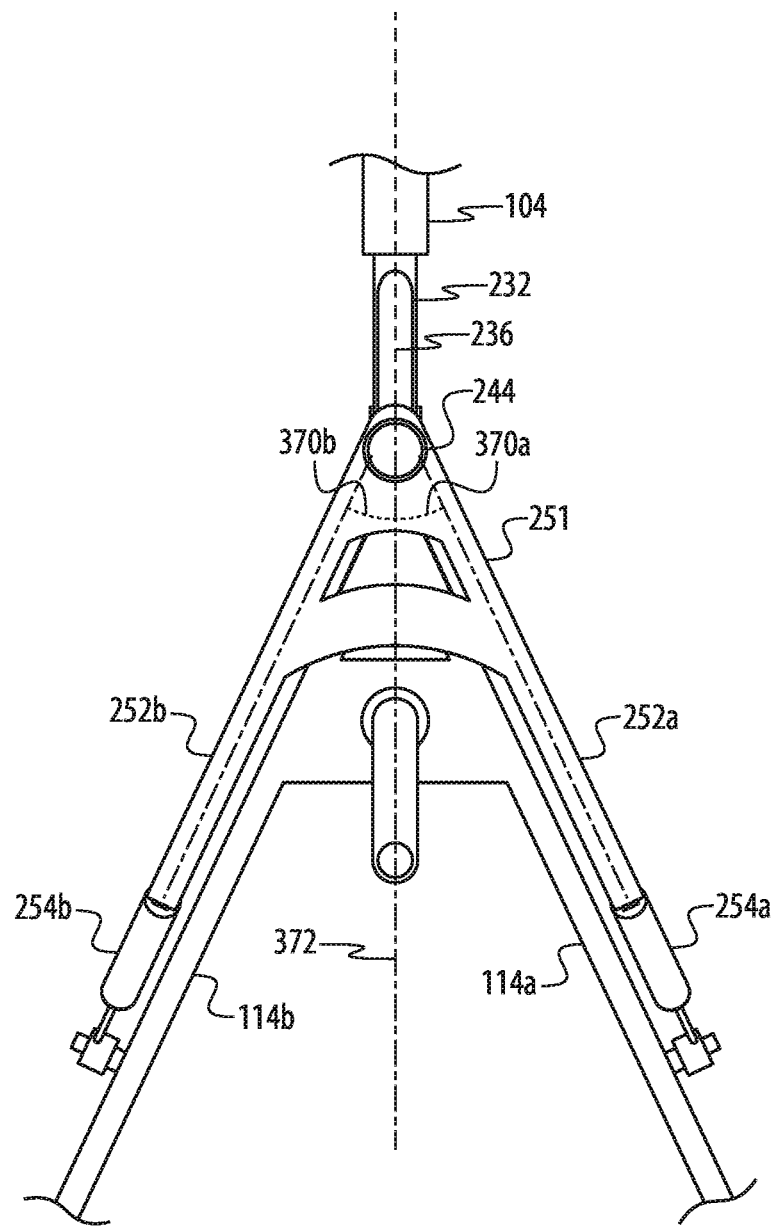
FIGS. 3A-3B illustrate top views of the stabilization system of FIG. 1.
Figure 3B:
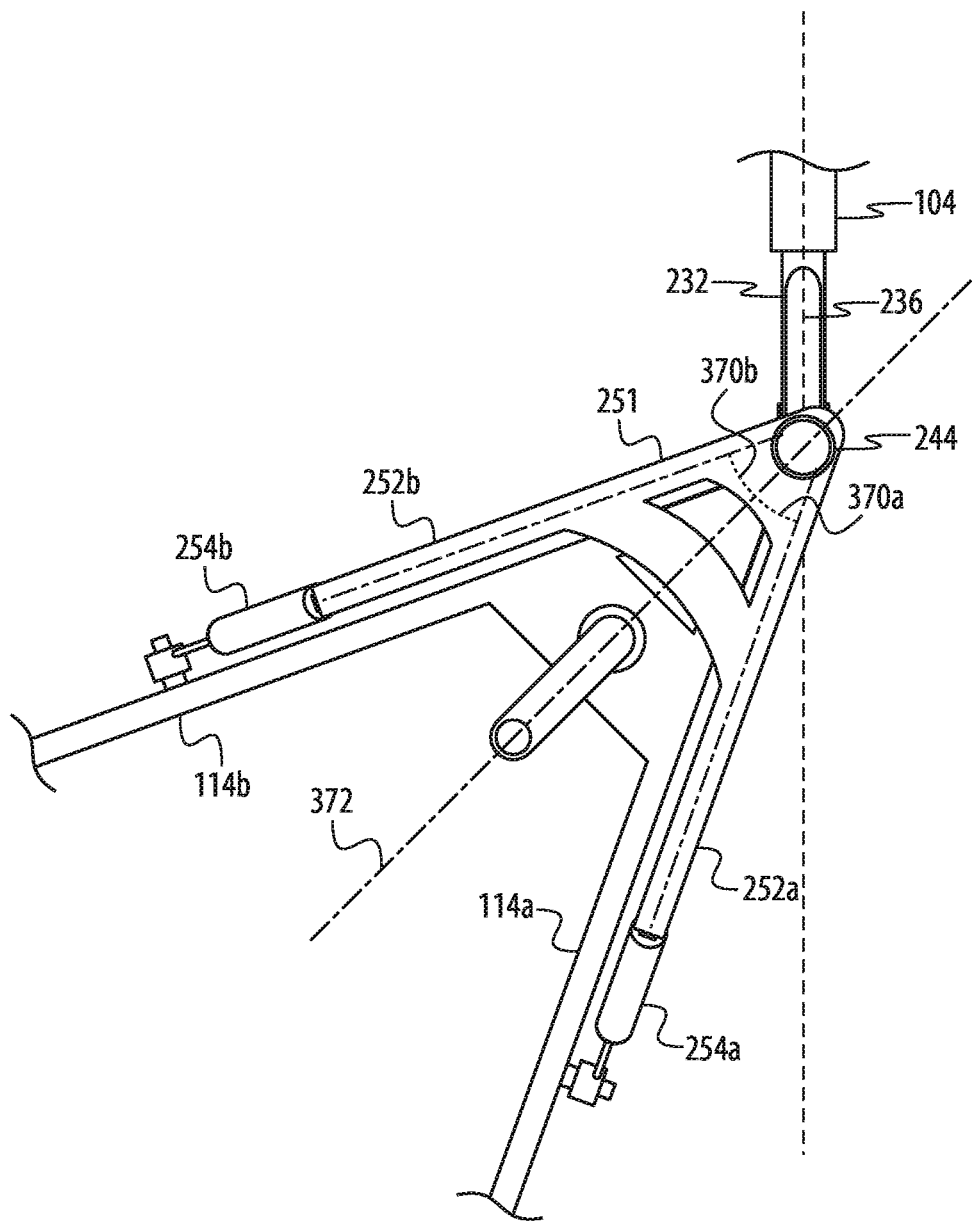

FIGS. 3A and 3B illustrate top views of the stabilization system 120. FIG. 3A illustrates the trailer 110 in a neutral position with respect to the tow vehicle 102. FIG. 3B illustrates the trailer 110 in a turning or rotated position with respect to the tow vehicle 102. The trailer 110 may be in the neutral position while the tow vehicle 102 and the trailer are traveling in a straight line, and the trailer may rotate with respect to the tow vehicle (e.g., assume a turning position) when the tow vehicle makes a turn. The turning position shown in FIG. 3B is not meant to be limiting; as the trailer 110 and the tow vehicle 102 navigate a turn, the trailer 110 may rotate through many different turning positions with respect to the tow vehicle 102.

As shown in FIG. 3A, the trailer 110 may define a central axis 372 that is substantially aligned with the central axis 326 of the tow beam 232 when the trailer is in a neutral position with respect to the tow vehicle 102. As shown in FIG. 3B, the central axis 372 may deviate from the central axis 326 when the trailer is in a turning position. As noted above, the stabilization system 120 may maintain alignment with the trailer 110 (e.g., with the tongue sections 114a, 114b) as the trailer rotates with respect to the tow vehicle 102.

As shown in FIGS. 3A and 3B, the arms 252a, 252b may extend toward the trailer 110 in different directions (e.g., at different angles relative to the central axis 372 of the trailer). In some cases, the first arm 252a may extend toward the trailer 110 at a first angle 370a with respect to the central axis 372 of the trailer and the second arm 252b may extend toward the trailer at a second angle 370b with respect to the central axis 372 of the trailer. The magnitudes of the first angle 370b and the second angle 370b may be the same, but the angles 370a, 370b may be defined on opposite sides of the central axis 372. In some cases, the angles 370a, 370b are between 10 and 60 degrees, between 20 and 50 degrees, or between 25 and 35 degrees.

The angles 370a, 370b may together define a separation angle of the arms 252a, 252b. In some cases, the separation angle of the arms 252a, 252b is equal to a separation angle of the first and second sections 114a, 114b of the tongue 114. In some cases, at least a portion of the arms 252a, 252b may extend over the first and second sections 114a, 114b of the tongue 114.

As shown in FIGS. 1-3B, in some cases, the arms 252a, 252b are defined by a single arm structure that is coupled to the pivot mechanism 244. In other cases, the arms 252a, 252b may be separate components that are coupled to one another and/or the pivot mechanism 244. An example embodiment with arms formed by separate components is shown and described with respect to FIG. 5.

Figure 4A:
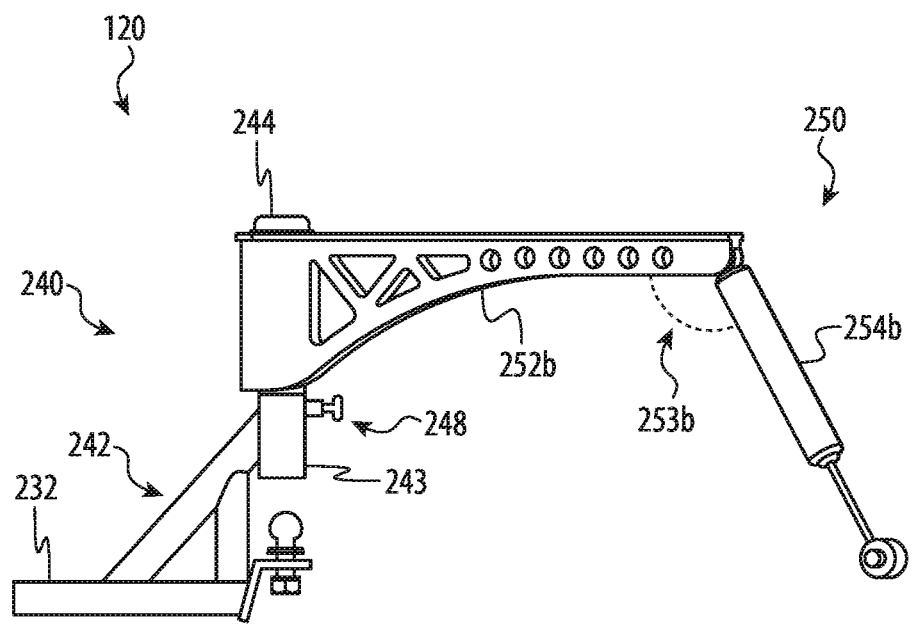
FIGS. 4A and 4B illustrate an embodiment of a stabilization system in which a height of a pivot mechanism is adjustable.
Figure 4B:
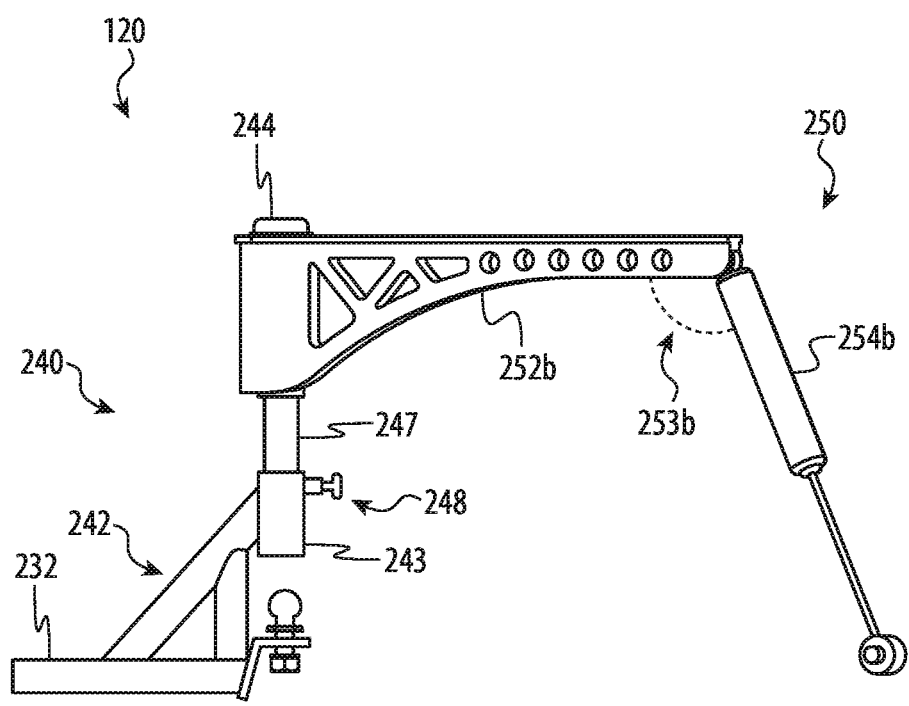

As noted above, in some cases, a height of the pivot mechanism 244 (and therefore the arm structure 251) relative to the tow beam 232 may be adjustable. FIGS. 4A and 4B illustrate an embodiment of the stabilization system 120 in which a height of the pivot mechanism 244 is adjustable. In particular, the stabilizer arm assembly 250 may be configured to slide upward and downward with respect to the tow beam 232 in order to accommodate different height configurations. Similar to previous examples, the stabilizer arm assembly 250 may be attached to a tow beam 232 having a riser structure 242 that is used to couple the system to the tow hitch receive of a towing vehicle.

In the example depicted in FIGS. 4A and 4B, the tower assembly 240 includes a sleeve member 243 that is configured to receive an extender 247 (FIG. 4B) that is coupled to or integrated with the pivot mechanism 244. The extender 247 may be configured to move up and down within the sleeve member 243 to adjust a height of the pivot mechanism 244 relative to the tow beam 232. The tower assembly 240 may include a retention mechanism 248 to fix a position of the extender 247. In some cases, the retention mechanism 248 may be a spring pin, and the extender 247 may define a series of machined holes, each of which is configured to receive the spring pin at a different position of the extender 247. A user may pull the spring pin to disengage the spring pin to change the position of the extender 247, and therefore the height of the pivot mechanism 244 relative to the tow beam 232. The tower assembly 240 may include a shoulder or thrust assembly that supports the extender 247 in lifted positions.

The height of the pivot mechanism 244 may be adjusted to facilitate attachment of the stabilization system 120 to different types of trailers having different structures and/or different positions for attaching the piston damping assemblies 254a, 254b. Additionally or alternatively, the piston damping assemblies 254a, 254b, the arms 252a, 252b, and/or other components of the stabilization system 120 may be adjustable. In some cases, as shown in FIGS. 4A and 4B, adjusting a height of the pivot mechanism 244 may change a length of the piston damping assemblies and/or an angle of the piston damping assemblies relative to the arms of the arm structure (e.g., angle 253b of the piston damping assembly 254b relative to the arm 252b).

Figure 5:
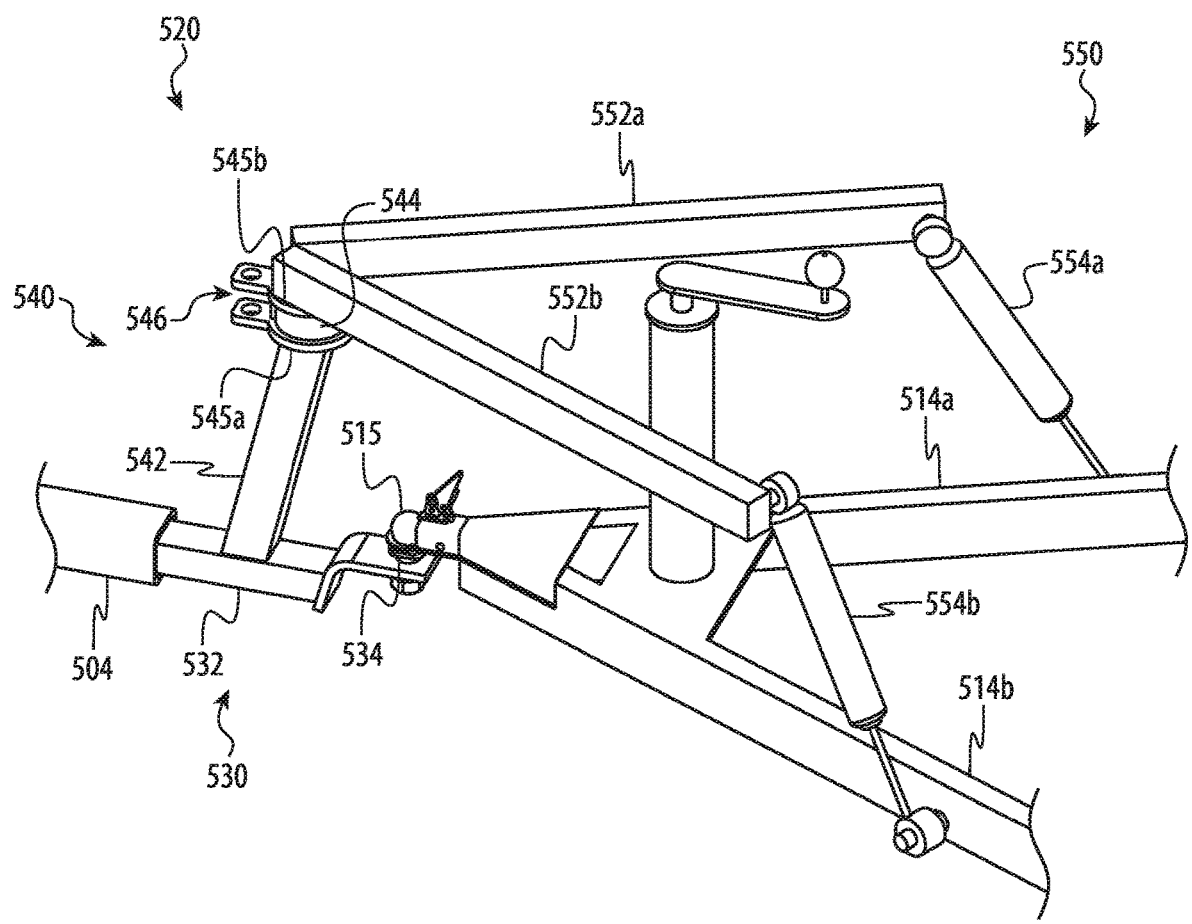
FIG. 5 illustrates an example stabilization system that includes arms formed from separate components.

As noted above, in some cases, the stabilization systems described herein may include arms that are separate components coupled together. FIG. 5 illustrates an example stabilization system 520 that includes arms 552a, 552b formed from separate components. The stabilization system 520 may be similar to the stabilization system 120, and may have similar components and characteristics and/or provide similar functionality. The stabilization system 520 may be used to couple a trailer to a towing vehicle. The trailer and/or the towing vehicle may be similar to the trailer 110 and towing vehicle 102 discussed herein, and may have similar components and characteristics and/or provide similar functionality.

The stabilization system 520 may include a hitch ball assembly 530, a tower assembly 540, and a stabilizer arm assembly 550. The hitch ball assembly 530 may include a tow beam 532 that is configured to be coupled to a trailer hitch receiver 504 of the towing vehicle. The hitch ball assembly 530 may additionally include a hitch ball 534 configured to be coupled to a trailer coupler assembly 515 of the trailer.

The tower assembly 540 may include a riser structure 542 extending upward from the tow beam 232 and a pivot mechanism 544. The pivot mechanism 544 may be defined by plates 545a, 545b that swivel with respect to one another. One plate 545a may be attached to the riser structure 542, and one plate 545b may be attached to the arms 552a, 552b such that the arms can swivel with respect to the riser structure.

The tower assembly 540 may further include a swivel prohibitor 546 to prevent the trailer from rotating or turning relative to the towing vehicle. Preventing the trailer from rotating or turning relative to the towing vehicle may be useful to cause the trailer to track straight behind the towing vehicle. This may be helpful for going up or down steeply sloped terrain, traversing sloped terrain, and the like. The swivel prohibitor may be defined by tabs or other features extending from each plate 545a, 545b. The tabs may include holes such that a swivel prohibitor pin may be inserted through the tabs to prevent the plates from swiveling relative to one another, thereby preventing the arms 552a, 552b from pivoting.

The stabilizer arm assembly 550 may include the arms 552a, 552b and piston damping assemblies 554a, 554b extending from a respective arm to a respective trailer tongue section 514a, 514b. As noted above, the arms 552a, 552b may be formed from separate components that are attached to one another and/or the pivot mechanism 544. In some cases, the arms 552a, 552b may be welded to one another and/or the pivot mechanism 544. In some cases, the arms 552a, 552b are solid bars formed of steel or another suitable material.

Figure 6:
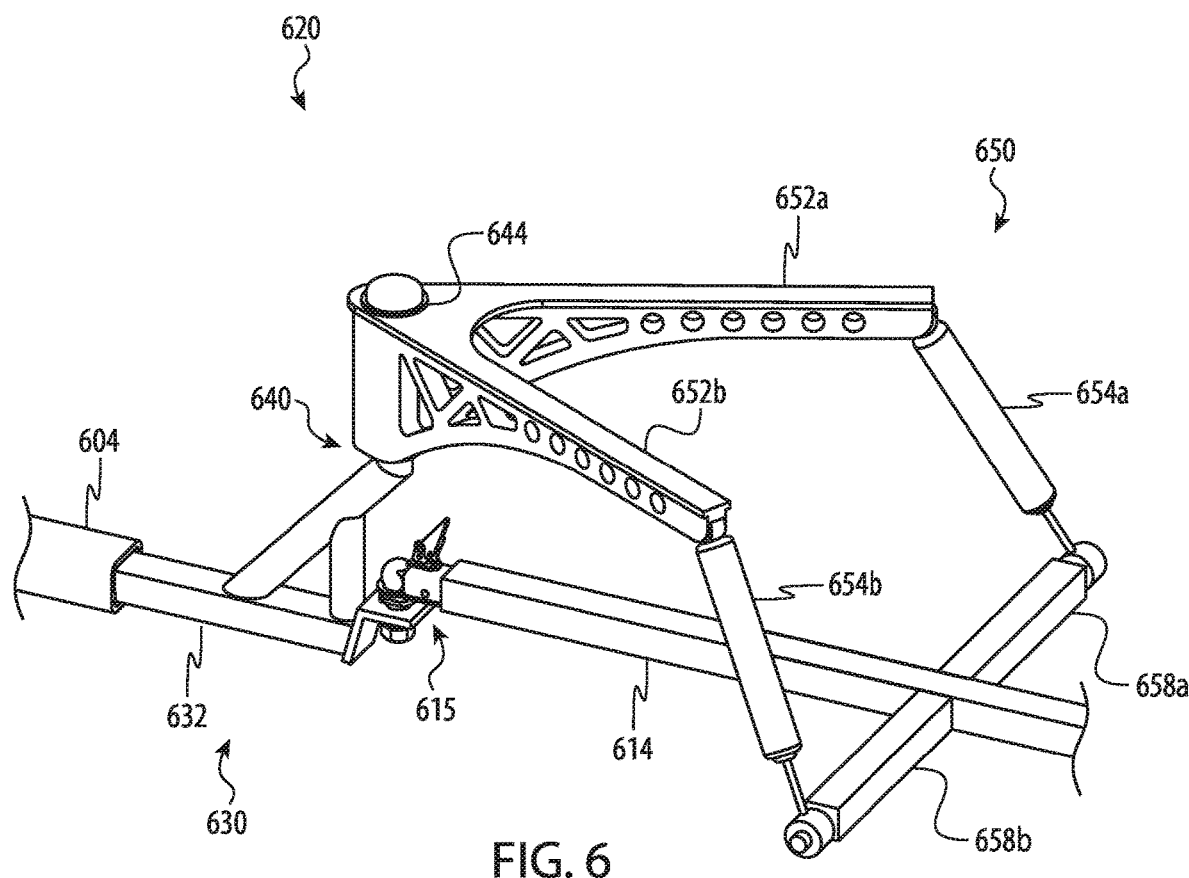
FIG. 6 illustrates an example stabilization system for stabilizing a trailer having a tow bar.

As noted above, the stabilization systems described herein may be adapted to attach to different types of trailers having different structures and/or attachment locations. In some cases, a trailer may have a single tow bar instead of a tongue with multiple sections. FIG. 6 illustrates an example stabilization system 620 for stabilizing a trailer having a tow bar 614. The stabilization system 620 may be similar to the stabilization systems 120 and/or 520, and may have similar components and characteristics and/or provide similar functionality. The trailer and/or the towing vehicle may be similar to the trailer 110 and towing vehicle 102 discussed herein, and may have similar components and characteristics and/or provide similar functionality. The tow bar 614 may include or be attached to a trailer coupler assembly 615 that is configured to couple to a hitch ball or other towing hitch coupler assembly of the stabilization system 620.

The stabilization system 620 may include a hitch ball assembly 630, a tower assembly 640, and a stabilizer arm assembly 650. The hitch ball assembly 630 may include a tow beam 632 that is configured to be coupled to a trailer hitch receiver 604 of the towing vehicle. The tower assembly 640 may include a pivot mechanism 644 that is similar to the pivot mechanism 244 of the stabilization system 120.

The stabilizer arm assembly 650 may include arms 652a, 652b and piston damping assemblies 654a, 654b extending from each arm, similar to the arms and piston damping assemblies of the stabilization system 120. The stabilizer arm assembly 650 may further include stabilizer arms 658a, 658b that are attached to the tow bar 614. Each piston damping assembly 654a, 654b may extend from its respective arm 652a, 652b to a respective stabilizer arm 658a, 658b. The piston damping assemblies 654a, 654b may be configured to exert one or more forces on the tow bar 614 to prevent or reduce movement of the trailer relative to the towing vehicle, as described herein.

The stabilizer arms 658a, 658b may be attached to the tow bar 614 using any suitable techniques and/or components, including bolts, plates, cables, pins, and the like. In some cases, the stabilizer arms 658a, 658b may be welded or otherwise affixed to the tow bar 614. In some cases, both of the arms 658a and 658b may be formed by a single component. In some cases, the arms 658a, 658b may be defined by different components that are attached to one another and/or the tow bar 614.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A stabilization system for use with an off-road vehicle, the stabilization system comprising:
   a hitch ball assembly comprising:
      a tow beam having a first end configured to attach to a trailer hitch receiver of a towing vehicle and a second end opposite the first end, the tow beam defining a central axis; and
      a hitch ball coupled to the second end of the tow beam;
   a tower assembly coupled to the hitch ball assembly and comprising:
      a riser beam extending upward from the tow beam; and
      a pivot mechanism configured to rotate about a pivot axis that is transverse to the central axis of the tow beam; and
   a stabilizer arm assembly coupled to the pivot mechanism and configured to rotate about the pivot axis, the stabilizer arm assembly comprising:
      a first arm extending toward a trailer at a first angle with respect to the central axis of the tow beam;
      a second arm extending toward the trailer at a second angle with respect to the central axis of the tow beam;
      a first piston damping assembly extending from the first arm to the trailer; and
      a second piston damping assembly extending from the second arm to the trailer.

2. The stabilization system of claim 1, wherein the first piston damping assembly and the second piston damping assembly are configured to exert a downward force on the trailer in response to the trailer lifting with respect to the towing vehicle.

3. The stabilization system of claim 1, wherein:
   the first and second arms are perpendicular to the pivot axis;
   the first piston damping assembly is configured to extend toward the trailer at a third angle with respect to the first arm;
   the second piston damping assembly is configured to extend toward the trailer at a fourth angle with respect to the second arm; and
   the third angle and the fourth angle are between 120 and 150 degrees.

4. The stabilization system of claim 1, wherein the stabilizer arm assembly is configured to slide upward along the pivot axis with respect to the hitch ball assembly.

5. The stabilization system of claim 1, wherein:
   the trailer comprises:
      a trailer body;
      a trailer coupler assembly configured to couple to the hitch ball and pivot relative to the hitch ball;
      a first tongue section extending from the trailer coupler assembly toward the trailer body; and
      a second tongue section extending from the trailer coupler assembly toward the trailer body;
   the first arm extends over the first tongue section; and
   the second arm extends over the second tongue section.

6. The stabilization system of claim 5, wherein the trailer is configured to pivot about the pivot axis during a towing activity.

7. The stabilization system of claim 1, wherein a height of a pivot assembly relative to the tow beam is adjustable.

8. The stabilization system of claim 1, wherein the towing vehicle is an off-road vehicle having a gross vehicle weight rating of less than 2000 pounds and between 14 inches and 20 inches of wheel travel.

9. A trailer system for towing behind an off-road vehicle, comprising:
   a trailer comprising:
      a trailer frame;
      a trailer body coupled to the trailer frame;
      a wheel assembly coupled to the trailer frame;
      a tongue coupled to the trailer frame and comprising:
         a first tongue section extending from the trailer frame;
         a second tongue section extending from the trailer frame; and
         a trailer coupler assembly attached to the first and second tongue sections; and
   a stabilizer system coupled to the trailer and comprising:
      a hitch ball assembly comprising:
         a tow structure configured to attach to a trailer hitch receiver of a towing vehicle; and
         a towing hitch coupler assembly coupled to the trailer coupler assembly of the trailer;
      a tower assembly coupled to the hitch ball assembly and comprising:
         a riser structure extending upward from the tow structure; and
         a pivot mechanism configured to rotate about a pivot axis; and
      a stabilizer arm assembly coupled to the pivot mechanism and configured to rotate about the pivot axis, the stabilizer arm assembly comprising:
         a first arm extending toward the trailer;
         a second arm extending toward the trailer;
         a first piston damping assembly extending from the first arm to the first tongue section of the trailer; and
         a second piston damping assembly extending from the second arm to the second tongue section of the trailer.

10. The trailer system of claim 9, wherein:
    the stabilizer arm assembly comprises an arm structure that defines the first arm and the second arm; and
    the arm structure at least partially surrounds the pivot mechanism.

11. The trailer system of claim 9, wherein the pivot mechanism comprises a spindle hinge.

12. The trailer system of claim 9, wherein:
the tow structure defines a central axis; and
the pivot axis is perpendicular to the central axis.

13. The trailer system of claim 12, wherein the first and second piston damping assemblies extend transverse to the pivot axis and the central axis.

14. The trailer system of claim 9, wherein, in response to the trailer lifting with respect to the towing vehicle:
the first piston damping assembly is configured to exert a first downward force on the first tongue section of the trailer; and
the second piston damping assembly is configured to exert a second downward force on the second tongue section of the trailer.

15. The trailer system of claim 9, wherein, in response to the trailer rolling with respect to the towing vehicle:
the first piston damping assembly is configured to exert a first upward force on the first tongue section of the trailer; and
the second piston damping assembly is configured to exert a second upward force on the second tongue section of the trailer.

16. A stabilization system for use with an off-road trailer, the stabilization system comprising:
a riser beam extending from a hitch ball assembly, the hitch ball assembly configured to couple the off-road trailer to a towing vehicle;
an arm structure pivotally coupled to the riser beam and configured to rotate about a pivot axis that is perpendicular to a central axis of a tow beam, the arm structure defining:
a first arm extending toward the off-road trailer at a first angle with respect to the central axis of the tow beam; and
a second arm extending toward the off-road trailer at a second angle with respect to the central axis of the tow beam;
a first piston damping assembly extending from the first arm to the off-road trailer; and
a second piston damping assembly extending from the second arm to the off-road trailer.

17. The stabilization system of claim 16, wherein:
the first piston damping assembly extends along a first axis having a first angular separation between 30 and 60 degrees relative to the pivot axis; and
the second piston damping assembly extends along a second axis having a second angular separation between 30 and 60 degrees relative to the pivot axis.

18. The stabilization system of claim 16, wherein the off-road trailer is configured to pivot about the pivot axis.

19. The stabilization system of claim 16, wherein the first and second arms extend along a plane that is parallel to the central axis.

20. The stabilization system of claim 16, wherein the first and second angles are between 15 and 45 degrees.

* * * * *